United States Patent [19]
Dobler et al.

[11] Patent Number: 5,567,035
[45] Date of Patent: Oct. 22, 1996

[54] HEADLIGHT FOR VEHICLES WITH REFLECTOR ADJUSTING DEVICE

[75] Inventors: Karl-Otto Dobler, Reutlingen; Gustav Klett, Moessingen; Horst Dahm, Neuhengstett; Rainer Jocher, Aidlingen, all of Germany

[73] Assignee: Robert Bosch GmbH, Stuttgart, Germany

[21] Appl. No.: 491,782

[22] Filed: Jun. 19, 1995

[30] Foreign Application Priority Data

Jun. 17, 1994 [DE] Germany .......................... 44 21 355.7

[51] Int. Cl.⁶ ..................................................... B60Q 1/04
[52] U.S. Cl. ............................. 362/66; 362/69; 362/423
[58] Field of Search ................................. 362/66, 68, 69, 362/277, 282, 423, 424, 425, 428

[56] References Cited

U.S. PATENT DOCUMENTS

| | | | |
|---|---|---|---|
| 4,674,013 | 6/1987 | Manzoni | 362/428 |
| 5,321,589 | 6/1994 | Shinkawa et al. | 362/428 |

FOREIGN PATENT DOCUMENTS

| | | | |
|---|---|---|---|
| 2493959 | 5/1982 | France | 362/66 |
| 3515150 | 10/1986 | Germany | |

*Primary Examiner*—Denise L. Gromada
*Assistant Examiner*—Alfred Basichas
*Attorney, Agent, or Firm*—Michael J. Striker

[57] ABSTRACT

The headlight has a reflector mounted inside a casing and swivelable about an axis by an adjustment element rotatably mounted in the casing. The adjustment element has a portion formed eccentrically to its axis of rotation. In the casing a transmission element is mounted for swiveling about an axis and is swivelably connected to the reflector. The transmission element has a recess in which the eccentric portion of the adjustment element is received, so that the transmission element is coupled, in the tangential direction relative to the axis about which it is swivelable in the casing, to the eccentric portion. On rotation of the adjustment element the reflector is swiveled about the swivel axis and the magnitude of the swiveling movement of the reflector is determined by the magnitude of the eccentricity of the portion and the lever ratios of the transmission element.

21 Claims, 2 Drawing Sheets

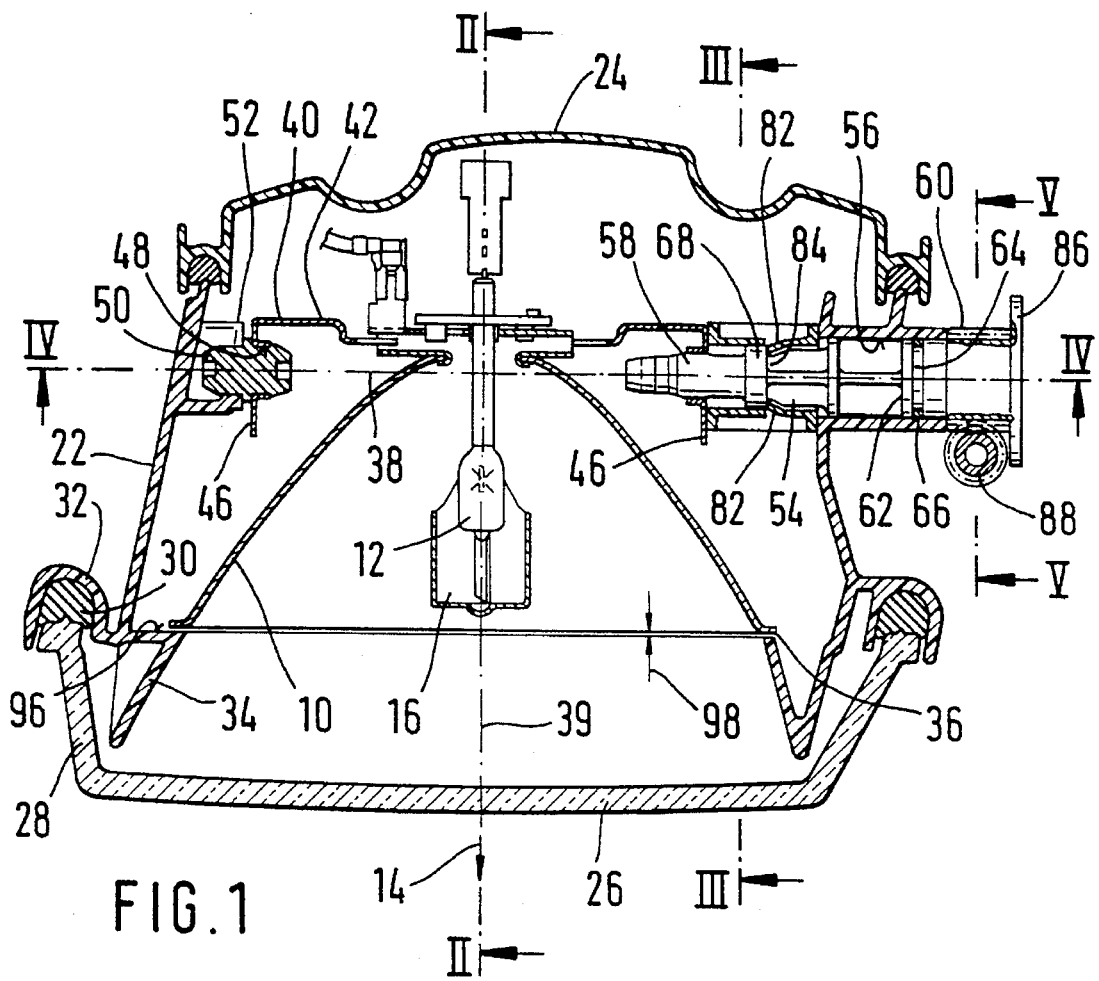
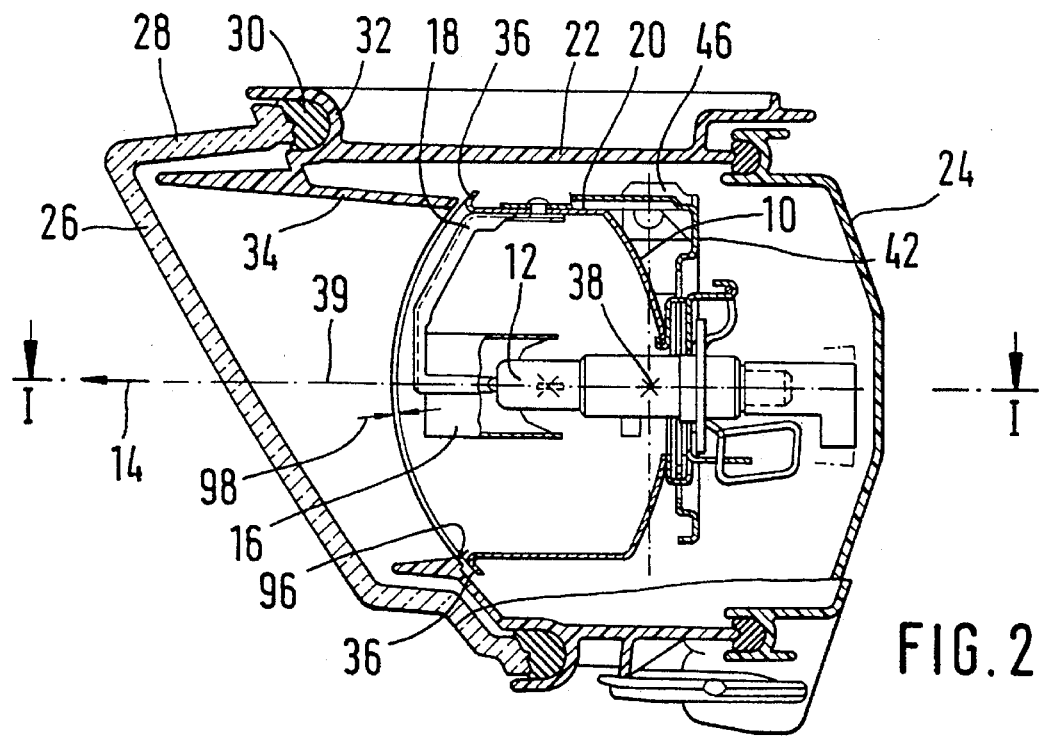
FIG. 1
FIG. 2

HEADLIGHT FOR VEHICLES WITH REFLECTOR ADJUSTING DEVICE

BACKGROUND OF THE INVENTION

The present invention relates to a headlight for vehicles.

A headlight known from DE 35 15 150 A1 has a holder and a reflector which is at least indirectly mounted on the holder and is swivelable relative to the holder about at least one axis by means of and adjustment device. This holder is in the form of a frame and an adjustment element of the adjustment device is rotatably mounted on said frame. The adjustment element is in the form of an adjusting screw which by means of a nut element is pivoted at least indirectly on the reflector eccentrically to the swivel axis of the reflector. The adjusting screw extends approximately parallel to the optical axis of the reflector and on the rear side of the holder projects through the latter. The space available for installing the headlight on the vehicle is often restricted, particularly on the rear side of the holder, facing the engine compartment of the vehicle, so that in certain circumstances it is not possible to provide sufficient space on the rear side of the headlight for the actuation of the adjustment element. The swiveling movement of the reflector must be limited in both swiveling directions by a respective stop, in order to prevent detachment of the connection of the adjustment element to the nut element. Particularly in the case of automated adjustment of the reflector, there is then a risk that component parts of the headlight will be damaged on striking against the stop.

SUMMARY OF THE INVENTION

Accordingly, it is an object of the present invention to provide a headlight for vehicles which avoids the disadvantages of the prior art.

In keeping with these objects and with others which will become apparent hereinafter, one feature of the present invention resides, briefly stated, in a headlight which has a holder and a reflector at least indirectly mounted on the holder and swivelable relative to the holder about at least one swivel axis by an adjusting device, the adjusting device has an adjusting element rotatably mounted on the holder and provided with a portion which is formed eccentrically relative to the swivel axis, and also the adjusting device has a transmission element mounted on the holder for swiveling about an additional axis, the transmission element is at least indirectly swivelably connected to the reflector eccentrically to the additional axis and is coupled, eccentrically to the additional axis, to the eccentric portion of the adjustment element in the tangential direction relative to the additional axis.

When the headlight for a vehicle is designed in accordance with the present invention, it has in contrast the advantage that the installed position of the adjustment element can be selected in coordination with the arrangement in each individual case of the swivel axis of the reflector in dependence on the installation conditions of the headlight. The adjustment device of the invention is in addition distinguished by compact construction.

In accordance with a further feature of the present invention the adjustment element is rotatable about its axis of rotation through an angle 360 degrees relative to the holder. With the rotatability of the adjustment element through an angle of 360 degrees, a stop is not required in any direction for the limitation of the swiveling movement of the reflector, so that the above described difficulties in the adjustment of the reflector are avoided. In accordance with another feature of the present invention the adjustment element serves at the same time as a bearing element for the reflector, and the axis of rotation of the adjustment element extends at least approximately coaxially to the swivel axis of the reflector. With this design a simple construction of the headlight is made possible, because the adjustment element makes an additional bearing element unnecessary. The adjustment element can have a portion which is arranged outside the holder and is provided with toothing, wherein outside the holder there is arranged, as another part of the adjustment device, an actuating element which is in engagement with the toothing of the portion of the adjustment element and together with the portion provided with the toothing the actuating element forms a reduction gear. This construction permits additional stepping-down of the adjustment movement of the reflector, so that the latter is capable of sensitive adjustment. The arrangement of the actuating element on the holder can here be selected in dependence on the installation conditions of the headlight.

Still another feature of the present invention is that the holder is formed as a casing, and the reflector is arranged inside the casing. Thereby the gap existing between the reflector and the holder part can be kept small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a headlight for vehicles in a horizontal longitudinal section along the line I—I in FIG. 2;

FIG. 2 shows the headlight in a vertical longitudinal section along the line II—II in FIG. 1;

DESCRIPTION OF THE PREFERRED EMBODIMENTS

Figure 3:
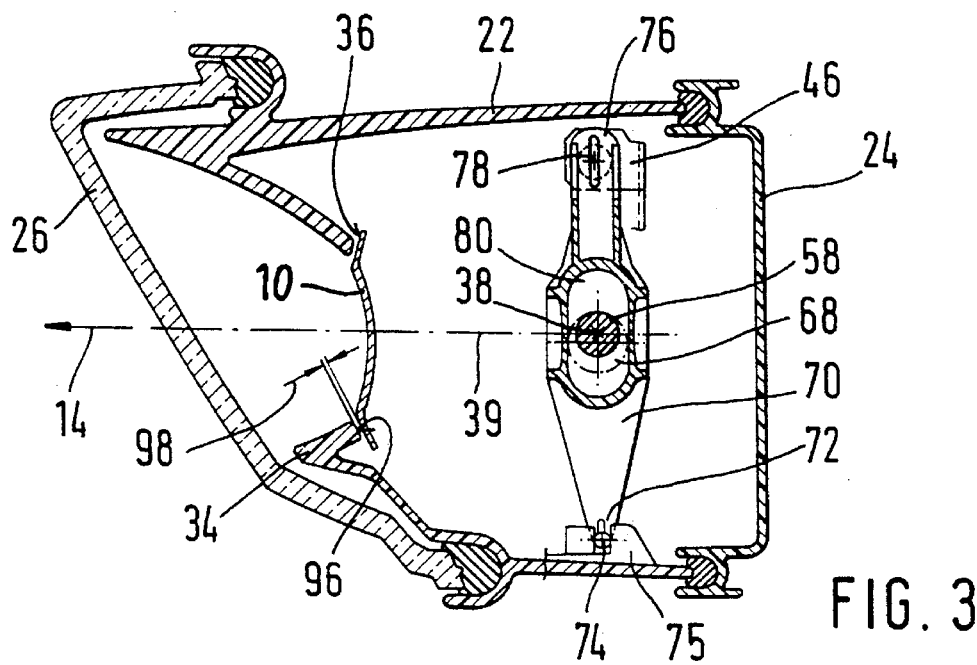
FIG. 3 shows the headlight in a vertical longitudinal section along the line III—III in FIG. 1.

A headlight for vehicles, particularly motor vehicles, which is illustrated in FIGS. 1 to 5, has a reflector 10 into which a light source 12 is inserted. The light source 12 used may be an incandescent lamp or a gas discharge lamp. The reflector 10 is made of sheet metal, but may also be made of any other suitable materials, for example of plastic. In order to screen light emitted directly by the light source 12 in the light emission direction 14, a screening cap 16 is provided which partly surrounds the light source 12 and which, as shown in FIG. 2, is fastened by means of a bracket 18 to a top wall 20 of the reflector 10. The reflector 10 is adjustably mounted on a holder in the form of a casing 22. On its rear side, pointing oppositely to the light emission direction 14, the casing 22 has an opening which can be closed by means of a cap 24 and through which the light source 12 is accessible for replacement purposes. The light emission opening of the casing 22 is closed by a transparent cover disc 26, which may have a smooth surface or be provided with optically active elements. The cover disk 26 has a circumferential rim 28 pointing towards the casing 22 and received in a circumferential groove 30 which is open in the light emission direction 14 and which is formed in a flange 32 projecting outwards from the casing 22. The casing 22 has a portion 34 which is arranged inside the circumferential rim 28 of the cover disk 26 and which projects beyond the flange 32 in the light emission direction 14 and has a shape tapering oppositely to the light emission direction 14. The portion 34 may also be in the form of a separate part connected to the casing 22. The portion 34 may have a conical or curved shape, and its end pointing oppositely to the light emission direction 14 has a free cross-section corresponding approximately to the internal area of the reflector 10 at its front edge 36, which points in the light emission direction 14, so that light reflected by the reflector 10 can pass out unhindered through the portion 34.

The reflector 10 is arranged inside the casing 22 and is mounted therein for swiveling about an axis 38 extending approximately horizontally. Swivelability of the reflector 10 about a horizontal axis is necessary, for example in order to permit adjustment of the inclination of the reflector, as prescribed by law, for fog lights for motor vehicles. The axis 38 extends approximately in the horizontal longitudinal center plane of the reflector 10 at right angles to the optical axis 39 of the reflector 10 and close to the apex region of the latter. A holding element 40, which is in the form of a holding frame and is arranged in the region of the apex of the reflector 10, is rigidly connected to the latter. As illustrated in FIG. 1, the holding frame 40 comprises a main region 42 which is connected to the reflector 10 and is substantially planar and which extends approximately at right angles to the optical axis 39, and also comprises lateral bearing regions 46 extending approximately parallel to the optical axis 39 of the reflector 10 and pointing in the light emission direction 14. Each of the bearing regions 46 has an opening 48, in which are engaged the ends of bearing elements which by their other ends are mounted in walls of the casing 22. A bearing element 50, shown on the left in FIG. 1, is in the form of a pin, which is mounted in a seat 52 in a side wall of the casing 22. The pin 50 is pressed into the opening 48 and is swivelably mounted in the seat 52. In the opening 48 of the other bearing region 46, on the right in FIG. 1, is engaged an adjustment element 54 which is rotatably mounted in a cylindrical seat 56 in the side wall of the casing 22 opposite the seat 52 and is part of an adjustment device by which the reflector 10 can be swiveled about the axis 38. By means of the bearing element 50 and the adjustment element 54 the holding frame 40, together with the reflector 10, is mounted for swiveling about the axis 38 formed by said elements.

The adjustment element 54 has at its front end a pin-like portion 58 pressed into the opening 48 of the bearing region 46, while its other end 60 projects out of the casing 22. In the seat 56 the adjustment element 54 has a portion 62 which in its outer contour is at least in part circular-cylindrical and which is provided with an annular groove 64, between which and the seat 56 a sealing ring 66 is clamped. The pin-like portion 58 and that portion 62 of the adjustment element 54 which is mounted in the seat 56 are arranged coaxially to one another and define the swivel axis 38. The bearing region 46 is arranged at a distance from the inner side of that side wall of the casing 22 in which the seat 56 is formed. Between the seat 56 and the bearing region 46 the adjustment element 54 has a portion 68 which is eccentric to the axis 38. As shown in FIG. 3, the portion 68 has at least approximately a circular shape in section perpendicular to the axis 38 and has a diameter such that the adjustment element 54 can be inserted into the seat 56 from outside the casing 22.

As another part of the adjustment device there is arranged in the casing 22 a transmission element 70 which in the exemplary embodiment is two-armed and, in the installed position of the headlight, is arranged with its longitudinal direction approximately vertical. As shown in FIG. 3, the transmission element 70 is mounted in a seat 75 in the casing 22 for swiveling about an axis 74 extending eccentrically to the swivel axis 38 of the reflector 10, the axis 74 extending at least approximately parallel to the swivel axis 38 of the reflector 10. In the exemplary embodiment the axis 74 is arranged in the bottom end region 72 of the transmission element 70. The transmission element 70 is in addition mounted on the holding frame 40, eccentrically to the swivel axis 38 of the reflector 10, for swiveling about an axis 78, the axis 78 extending at least approximately parallel to the swivel axis 38. In the exemplary embodiment the transmission element 70 is swivelably mounted in its top end region 76 in a bearing region 46 of the holding frame 40. The swivelable connection of the top end region 76 of the transmission element 70 to the bearing region 46 is made by means of a pin 77 which is arranged on said element and which engages in an opening which is provided in a top region of the holding frame 40 and is arranged approximately vertically above the opening 48, in which the pin-like portion 58 of the adjustment element 54 engages. The transmission element 70 has a recess 80, in which the eccentric portion 68 of the adjustment element 54 is arranged. In the exemplary embodiment the recess 80 is arranged between the end regions 72 and 76 of the transmission element 70. The recess 80 is in the form of an elongated hole which in the radial direction, relative to the axis 74 about which the bottom end region 72 of the transmission element 70 is mounted for swiveling, has a greater extent than in the tangential direction relative to the axis 74. The width of the recess 80 in the tangential direction, relative to the axis 74, is dimensioned such that the eccentric portion 68 of the adjustment element 54 is rotatably received with slight play in the recess 80 and, in the radial direction relative to the axis 74, is translationally movable in the recess 80. The transmission element 70 is thus coupled, to the eccentric portion 68 of the adjustment element 54 in the tangential direction relative to the axis 74.

Figure 4:
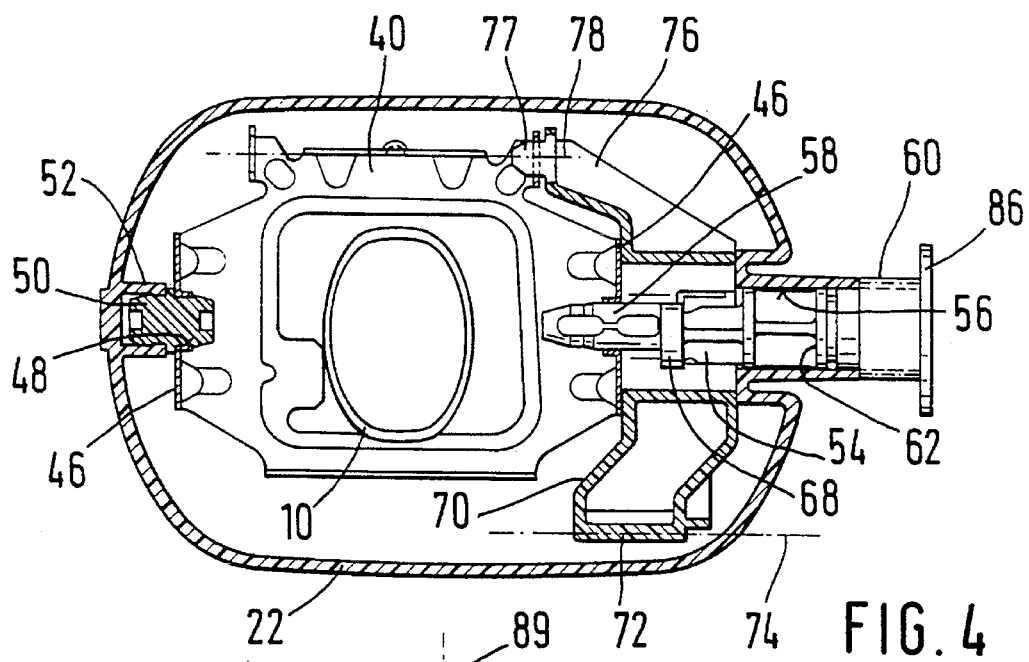
FIG. 4 shows the headlight in a vertical cross-section along the line IV—IV in FIG. 1.

The transmission element 70 is made of plastic and, as illustrated in FIG. 1, there is integrally formed on it at least one locking arm 82 which is resiliently deflectable transversely to the swivel axis 38 and which engages in a circumferential depression 84 in the adjustment element 54, in the direction of the casing 22, next to the eccentric portion 68 of said element, thereby securing the adjustment element 54 against being pulled out of the casing 22 along the swivel axis 38. In the exemplary embodiment two locking arms 82 are provided, being arranged opposite one another in relation to the swivel axis 38. As illustrated in FIG. 4, the side walls of the casing 22 are given an oval shape, viewed in section at right angles to the optical axis 39, with their curvature pointing outwards, and in section at right angles to the optical axis 39 of the curvature of the casing side wall arranged next to the transmission element 70, the transmission element 70 is approximately u-shaped, the end regions 72 and 74 of the latter being arranged as limbs extending away from the side wall towards the reflector 10.

Figure 5:
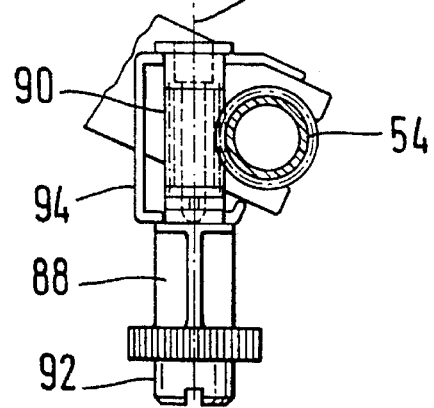
FIG. 5 shows the headlight in a vertical longitudinal section along the line V—V in FIG. 1.

That portion 60 of the adjustment element 54 which is arranged outside the casing 22 is provided over its periphery with worm toothing and, as shown in FIG. 1, a flange 86 having a larger diameter is formed at its end. That portion 60 of the adjustment element 54 which is arranged outside the casing 22 has a larger diameter than the portion 62 arranged in the seat 56, so that between these two portions 60 and 62 a step is provided which forms a stop limiting the movement pushing the adjustment element 54 into the casing 22. As illustrated in FIG. 5, outside the casing 22 there is arranged, as another part of the adjustment device and as actuating element for the adjustment element 54, an adjusting screw 88 having a portion 90 which is provided with a worm or a screw thread and which is in engagement with the worm toothing of the portion 60 of the adjustment element 54. The adjusting screw 88 is arranged at right angles to the swivel axis 38 and therefore to the longitudinal axis of the adjustment element 54, and at its end opposite the worm portion 90 has a head 92, which for example is provided with a hexagon and/or a cross slot for the application of a tool. The adjusting screw 88 is mounted on a bracket 94, which projects from the outer side of a side wall of the casing 22, for rotation about its longitudinal axis 89 but remains immovable in the direction of its longitudinal axis 89. In the exemplary embodiment illustrated, in the installed position of the headlight the adjusting screw 88 is arranged approximately vertically, with is head 94 pointing downwards. However, the adjusting screw 88 can also be arranged in any other positions at right angles to the swivel axis 38, around the portion 60 provided with the worm toothing. The arrangement of the adjusting screw 88 can be selected in a manner advantageous for the particular installation conditions of the headlight. The worm toothing of the portion 60 and the adjusting screw 88 form a reduction gear unit, that is to say for a particular angle of rotation of the adjusting screw 88 about its longitudinal axis 89 the adjustment element 54 is turned only through a smaller angle of rotation about the swivel axis 38.

The front edge 36, pointing in the light emission direction 14, of the reflector 10 is given a curved shape in planes at right angles to the swivel axis 38, the center point of its curvature being situated at least approximately on the swivel axis 38. That edge 96 of the portion 34 of the casing 22 which points oppositely to the light emission direction 14 likewise has a curved shape in planes at right angles to the swivel axis 38, the center point of its curvature being situated at least approximately on the swivel axis 38. The curvatures of the front edge 36 of the reflector 10 and of the edge 96 of the portion 34 are at least approximately parallel to one another. Between the front edge 36 of the reflector 10 and the edge 96 of the portion 34 a gap 98 is provided, the curvatures of the front edge 36 of the reflector 10 and of the edge 96 of the portion 34 being so designed that when the reflector 10 makes a swiveling movement about the swivel axis 38 the gap 98 remains at least approximately constant. The front edge 36 of the reflector 10 and the edge 96 of the portion 34 are preferably shaped at least approximately as circular arcs in sections at right angles to the swivel axis 38, their center points being arranged at least approximately on the swivel axis 38. In this arrangement the edge 96 has a radius exceeding by the size of the gap 98 the radius of the front edge 36. Depending on the size of the gap 98, a certain variation of the curvatures of the edge 96 and of the front edge 36 is possible.

The mode of operation of the adjustment device of the headlight described above is explained below. For the adjustment of the reflector 10 the adjusting screw 88 is turned and, by means of its worm portion 90 engaging in the worm toothing of the portion 60, in turn brings about a rotation of the adjustment element 54 about the swivel axis 38. On rotation of the adjustment element 54, the eccentric portion 68 of the latter is likewise turned but, because of its eccentric design relative to the swivel axis 38, also makes a movement at right angles to the swivel axis 38 and tangentially to the axis 74 about which the transmission element 70 is swivelable. The tangential component of the movement of the eccentric portion 68 is transmitted to the transmission element 70, in the recess 80 of which the portion 68 is received with slight play in the tangential direction and is thus coupled thereto. The transmission element 70 is thereby swiveled about the axis 74 at its bottom end region 72 mounted in the casing 22. The top end 76 of the transmission element 70 thus makes a swiveling movement about the axis 74, this movement being transmitted to the holding frame 40 through the connection of said element to the latter. The holding frame 40 and the reflector 10 connected to it are mounted by means of the bearing element 50 and the adjustment element 54, and thus make a swiveling movement about the swivel axis 38, so that the path of the optical axis 39 of the reflector 10 is varied in the vertical direction. The inclination of the optical axis 39 of the reflector 10, and therefore that of the light beam reflected by the reflector 10, in the downward direction is at its maximum when the eccentric portion 68 is so arranged that its greatest eccentricity relative to the axis 74 is arranged to be directed tangentially in the light emission direction 14. In this position the top end 76 of the transmission element 70 is situated in the position in which it has been swiveled the farthest in the light emission direction 14. The inclination of the optical axis 39 of the reflector 10, and therefore that of the light beam reflected by the reflector 10, in the upward direction is at its maximum when the eccentric portion 68 is so arranged that its greatest eccentricity relative to the axis 74 is arranged to be directed tangentially oppositely to the light emission direction 14. In this position the top end 76 of the transmission element 70 is situated in the position in which it has been swiveled the farthest oppositely to the light emission direction 14. The swiveling movement of the reflector 10 about the swivel axis 38 is not limited by a stop in any direction, on the contrary the adjustment element 54 can be turned beyond its extreme positions described above, whereupon an adjustment of the reflector 10 is again possible. In the exemplary embodiment illustrated, the eccentric portion 68 of the adjustment element 54 is so arranged inside the recess 80, in its central or zero position, that its greatest eccentricity relative to the swivel axis 38 is directed upwards or downwards. The adjustment element 54 can be turned through 360 degrees about the swivel axis 38, that is to say beyond its above described positions in which its greatest eccentricity is directed in or oppositely to the light emission direction 14, so that its greatest eccentricity is directed upwards. An additional stop for limiting the swiveling movement of the reflector 10 is not necessary, on the contrary the above described extreme positions of the eccentric portion 68 of the adjustment element 54 determine end positions of the reflector 10, beyond which the reflector 10 is swiveled back in the other direction when the adjustment element 54 is turned further. An adjustment of the reflector 10 is thus possible, by turning the adjustment element 54, from any angular position of said element. Starting from the adjusting screw 88 the swiveling movement of the reflector 10 about the swivel axis 38 is stepped down three times, namely firstly by the stepping-down between the worm portion 90 and the worm toothing of the portion 60, secondly by the eccentric portion 68 which is coupled to the transmission element 70, and thirdly by the lever ratios of the transmission element 70. The stepping-down between the eccentric portion 68 and the transmission element 70 is determined by the amount of the eccentricity of the portion 68 relative to the swivel axis 38. The lever ratios of the transmission element 70 result from the distances of the ends 72 and 76 of said element from one another and from the point at which the eccentric portion 68 acts. Because of the high step-down ratio the adjustment device described above is self-locking from the adjusting screw 88 to the reflector 10, so that forces acting on the reflector 10, for example as the result of vibrations during he running of the vehicle equipped with the headlight, cannot lead to displacement of the reflector 10.

When the reflector 10 makes a swiveling movement about the swivel axis 38, the front edge 36 of the reflector 10 also makes a movement about the swivel axis 38. Because of the above described design of the front edge 36 of the reflector 10 and of the edge 96 of the portion 34, the gap 98 remains at least approximately constant even when the reflector 10 makes a swiveling movement, and can therefore be kept small.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A headlight for vehicles, comprising a holder; an adjusting device; a reflector which is at least indirectly mounted on said holder and is swivelable relative to said holder about at least one swivel axis by means of said adjusting device, said adjusting device having an adjustment element rotatably mounted on said holder and rotatable about said swivel axis and having an eccentric portion formed eccentrically to said swivel axis, said adjustment device also having a transmission element which is mounted on said holder for swiveling about an additional axis and is at least indirectly swivelably connected to said reflector in a connecting point which is eccentric to said additional axis, said transmission element being coupled, eccentrically to said additional axis, to said eccentric portion of said adjustment element in a tangential direction relative to said additional axis so that during rotation of said adjustment element about said swivel axis via said eccentric portion said transmission element, due to its coupling with said eccentric portion, swivels about said additional axis and thereby said reflector is swiveled about said swivel axis because said transmission element is connected with said reflector in the connecting point which is eccentric to said additional axis.

2. A headlight as defined in claim 1, wherein said adjustment element is formed as a bearing element for said reflector and has an axis of rotation extending at least approximately coaxially to said swivel axis of said reflector.

3. A headlight as defined in claim 1, wherein said eccentric portion of said adjustment element has at least approximately circular shape in a section at right angles to said swivel axis.

4. A headlight as defined in claim 1, wherein said transmission element has a recess in which said eccentric portion of said adjustment element is received.

5. A headlight as defined in claim 1, wherein said holder is formed as a casing, said reflector being arranged inside said casing.

6. A headlight as defined in claim 1; and further comprising a holding element connected to said reflector, said reflector being mounted on said holder by said holding element.

7. A headlight as defined in claim 1, wherein said reflector has an optical axis, said swivel axis extending close and substantially at right angles to said optical axis of said reflector.

8. A headlight as defined in claim 1, wherein said reflector has a longitudinal center plane, said swivel axis extending at least substantially in said longitudinal center plane of said reflector.

9. A headlight as defined in claim 1, wherein said holder has a side wall, said adjustment element being mounted in said side wall of said holder.

10. A headlight for vehicles, comprising a holder; an adjusting device; a reflector which is at least indirectly mounted on said holder and is swivelable relative to said holder about at least one swivel axis by means of said adjusting device, said adjusting device having an adjustment element rotatably mounted on said holder and having an eccentric portion formed eccentrically to said swivel axis, said adjustment device also having a transmission element which is mounted on said holder for swiveling about an additional axis and is at least indirectly swivelably connected to said reflector eccentrically to said additional axis, said transmission element being coupled in a connecting points which is eccentric to said additional axis, to said eccentric portion of said adjustment element in a tangential direction relative to said additional axis, said adjustment element being rotatable about its axis of rotation through an angle of 360 degrees relative to said holder.

11. A headlight for vehicles, comprising a holder; an adjusting device; a reflector which is at least indirectly mounted on said holder and is swivelable relative to said holder about at least one swivel axis by means of said adjusting device, said adjusting device having an adjustment element rotatably mounted on said holder and having an eccentric portion formed eccentrically to said swivel axis, said adjustment device also having a transmission element which is mounted on said holder for swiveling about an additional axis and is at least indirectly swivelably connected to said reflector eccentrically to said additional axis, said transmission element being coupled in a connecting points which is eccentric to said additional axis, to said eccentric portion of said adjustment element in a tangential direction relative to said additional axis, said transmission element having a recess in which said eccentric portion of said adjustment element is received, said recess having, in a radial direction relative to said additional axis, a greater width than in a tangential direction relative to said additional axis, said eccentric portion of said adjustment element being received in said recess with slight play in a tangential direction relative to said additional axis.

12. A headlight for vehicles, comprising a holder; an adjusting device; a reflector which is at least indirectly mounted on said holder and is swivelable relative to said holder about at least one swivel axis by means of said adjusting device, said adjusting device having an adjustment element rotatably mounted on said holder and having an eccentric portion formed eccentrically to said swivel axis, said adjustment device also having a transmission element which is mounted on said holder for swiveling about an additional axis and is at least indirectly swivelably connected to said reflector eccentrically to said additional axis, said transmission element being coupled in a connecting points which is eccentric to said additional axis, to said eccentric portion of said adjustment element in a tangential direction relative to said additional axis, said transmission element having, in a radial direction relative to said additional axis, a greater width than in a tangential direction relative to said additional axis, said transmission element in an installed position of the headlight being arranged with its longitudinal direction approximately vertical.

13. A headlight for vehicles, comprising a holder; an adjusting device; a reflector which is at least indirectly mounted on said holder and is swivelable relative to said holder about at least one swivel axis by means of said adjusting device, said adjusting device having an adjustment element rotatably mounted on said holder and having an eccentric portion formed eccentrically to said swivel axis, said adjustment device also having a transmission element which is mounted on said holder for swiveling about an additional axis and is at least indirectly swivelably connected to said reflector eccentrically to said additional axis, said transmission element being coupled in a connecting points which is eccentric to said additional axis, to said eccentric portion of said adjustment element in a tangential direction relative to said additional axis, said adjustment element having a portion which is arranged outside said holder and provided with toothing, said adjustment device having another part arranged outside said holder and formed as an actuating element which is in engagement with said toothing of said portion of said adjustment element, said actuating element together with said portion provided with said toothing together forming a reduction gear unit.

14. A headlight as defined in claim 13, wherein said toothing of said portion of said adjustment element is worm toothing, said actuating element having a portion formed as a worm.

15. A headlight as defined in claim 13, wherein said actuating element has a longitudinal axis and is mounted on an outer side of said holder for rotation about said longitudinal axis, said actuating element being translationally immovable along said longitudinal axis.

16. A headlight for vehicles, comprising a holder; an adjusting device; a reflector which is at least indirectly mounted on said holder and is swivelable relative to said holder about at least one swivel axis by means of said adjusting device, said adjusting device having an adjustment element rotatably mounted on said holder and having an eccentric portion formed eccentrically to said swivel axis, said adjustment device also having a transmission element which is mounted on said holder for swiveling about an additional axis and is at least indirectly swivelably connected to said reflector eccentrically to said additional axis, said transmission element being coupled in a connecting points which is eccentric to said additional axis, to said eccentric portion of said adjustment element in a tangential direction relative to said additional axis, said reflector having a first front edge pointing in a light emission direction, said holder having a part provided with a second edge which points oppositely to the light emission direction and adjoins said first front edge of said reflector, said edges each having a curved shape in planes at right angles to said swivel axis of said reflector with curvatures formed so that center points of the curvatures are arranged at least approximately on said swivel axis of said reflector, said edges being arranged so that between said first edge and said second edge a distance is provided which remains at least approximately constant when said reflector makes a swiveling movement about said swivel axis.

17. A headlight as defined in claim 16, wherein said first edge of said reflector and said second edge of said part of said holder have at least approximately arc shape in planes at right angles to said swivel axis.

18. A headlight as defined in claim 16, wherein said second edge of said part of said holder has a greater radius than said first edge of said reflector.

19. A headlight as defined in claim 16, wherein said second edge of said part of said holder has a radius which exceeds a radius of said first edge of said reflector by said distance.

20. A headlight as defined in claim 16, wherein said part of said holder has a shape tapering oppositely to the light emission direction.

21. A headlight as defined in claim 16, wherein said part of said holder is formed integrally with the remaining part of said holder.

* * * * *